United States Patent
McFarland et al.

(10) Patent No.: US 7,568,565 B2
(45) Date of Patent: Aug. 4, 2009

(54) DEVICE, A SYSTEM AND A METHOD FOR TRANSFERRING VIBRATIONAL ENERGY

(75) Inventors: D. Michael McFarland, Hoopeston, IL (US); Lawrence A. Bergman, Champaign, IL (US); Alexander F. Vakakis, Athens (GR)

(73) Assignee: NES Technologies, Inc, Champaign, IL (US)

( * ) Notice: Subject to any disclaimer, the term of this patent is extended or adjusted under 35 U.S.C. 154(b) by 713 days.

(21) Appl. No.: 10/919,752

(22) Filed: Aug. 17, 2004

(65) Prior Publication Data

US 2006/0037822 A1 Feb. 23, 2006

(51) Int. Cl.
F16F 7/10 (2006.01)
F16M 1/00 (2006.01)
(52) U.S. Cl. .................. 188/380; 267/140.11; 248/638
(58) Field of Classification Search ................ 188/379, 188/380; 267/140.11, 136; 248/562, 566, 248/636, 638
See application file for complete search history.

(56) References Cited

U.S. PATENT DOCUMENTS

| | | | | |
|---|---|---|---|---|
| 2,016,207 A | * | 10/1935 | Lindenberg | 296/1.03 |
| 2,367,709 A | * | 1/1945 | Arkus-Duntov et al. | 74/574.3 |
| 3,379,135 A | * | 4/1968 | Kaatz | 464/88 |
| 3,536,165 A | * | 10/1970 | Desjardins | 188/380 |
| 4,365,770 A | | 12/1982 | Mard et al. | |
| 4,392,640 A | | 7/1983 | Kakimoto | |
| 4,550,812 A | | 11/1985 | Mard | |
| 4,583,912 A | | 4/1986 | Ball et al. | |
| 4,674,725 A | * | 6/1987 | Popper | 248/562 |
| 4,724,923 A | * | 2/1988 | Waterman | 181/208 |
| 4,766,984 A | | 8/1988 | Gaffey et al. | |
| 4,789,374 A | | 12/1988 | Suzuki | |
| 5,062,085 A | | 10/1991 | Andrews, Jr. | |
| 5,305,981 A | | 4/1994 | Cunningham et al. | |
| 5,558,191 A | | 9/1996 | Lai | |
| 5,586,512 A | | 12/1996 | Orbeck | |
| 5,816,373 A | * | 10/1998 | Osterberg et al. | 188/380 |
| 5,839,517 A | | 11/1998 | Gwinn et al. | |
| 5,855,260 A | | 1/1999 | Rubin | |
| 5,913,955 A | | 6/1999 | Redmond et al. | |
| 5,915,508 A | | 6/1999 | Lai | |
| 5,927,407 A | | 7/1999 | Gwinn et al. | |

(Continued)

FOREIGN PATENT DOCUMENTS

JP 6081534 A * 5/1985

(Continued)

Primary Examiner—Melody M Burch
(74) Attorney, Agent, or Firm—Patents + TMS, P.C.

(57) ABSTRACT

A nonlinear attachment induces energy to be transferred and/or to be pumped from a primary system or primary structure to the nonlinear attachment. The nonlinear attachment is an essentially nonlinear device and functions as a nonlinear energy sink. The nonlinear attachment attaches to the primary system or primary structure as a module and does not require connection to a ground. The energy is irreversibly pumped from the primary system or primary structure to the nonlinear attachment during transient resonance capture between the nonlinear attachment and the primary system or primary structure. The nonlinear attachment attenuates the energy of the primary system or primary structure. The nonlinear attachment locally confines the energy and/or dissipates the energy through a passive means and/or an active means.

7 Claims, 9 Drawing Sheets

U.S. PATENT DOCUMENTS

| | | | |
|---|---|---|---|
| 5,934,424 A | 8/1999 | Hosek et al. | |
| 5,934,653 A | 8/1999 | Rivin | |
| 5,954,169 A | 9/1999 | Jensen | |
| 5,964,327 A * | 10/1999 | Shih | 188/380 |
| 5,984,233 A | 11/1999 | Snyder, Jr. et al. | |
| 6,009,985 A * | 1/2000 | Ivers | 188/380 |
| 6,129,177 A | 10/2000 | Gwinn | |
| 6,170,202 B1 | 1/2001 | Davoodi et al. | |
| 6,195,442 B1 | 2/2001 | Griffin et al. | |
| 6,202,960 B1 | 3/2001 | Travis et al. | |
| 6,290,037 B1 | 9/2001 | Williams et al. | |
| 6,292,967 B1 | 9/2001 | Tabatabai et al. | |
| 6,371,456 B1 | 4/2002 | Ritchie et al. | |
| 6,443,673 B1 | 9/2002 | Etling et al. | |
| 6,530,563 B1 | 3/2003 | Miller et al. | |
| 6,619,165 B2 | 9/2003 | Perkowski | |
| 6,882,085 B2 * | 4/2005 | Komoda et al. | 310/323.12 |
| 2003/0051958 A1 * | 3/2003 | Esche et al. | 188/379 |

FOREIGN PATENT DOCUMENTS

| | | | |
|---|---|---|---|
| JP | 4272539 A * | 9/1992 | |
| WO | WO-9402755 A1 * | 2/1994 | |

* cited by examiner

DEVICE, A SYSTEM AND A METHOD FOR TRANSFERRING VIBRATIONAL ENERGY

BACKGROUND OF THE INVENTION

The present invention generally relates to a device, a system and a method for transferring energy. More specifically, the present invention relates to a device, a system and a method for pumping energy, such as, for example, vibrational energy from a main or a primary system and/or a main structure to an essentially nonlinear attachment, such as, for example, a nonlinear energy sink (hereinafter "NES"). The NES functions as an energy absorber, connects to the main structure as a module and requires no separate connection to a ground. Energy pumping is a one-way, irreversible transfer of the energy to the NES. As a result, the energy does not flow back to the main structure. Transferring the vibrational energy to the NES facilitates vibration and shock attenuation in the main structure following a disturbance, such as, for example, an externally induced disturbance. Further, after spatial confinements of the disturbance in the NES, vibrational energy is efficiently dissipated through a passive means and/or an active means. Moreover, the device resembles a narrow-band device, such as, for example, a classical vibration absorber or a tuned mass damper. However, the device and the system function as a broad-band absorber while attached only to the main structure. The broad-band absorber is derived from an essential nonlinearity of a connecting stiffness which may be achieved either with a mechanical spring or through an active control.

The device, the system and the method transfers energy and/or undesired motion from the main structure following the disturbance. The disturbance may be from, for example, a transient load, such as, for example, a shock or due to maneuvering of the main structure. Maneuvering the main structure typically results in a residual vibration, such as, for example, ringing. The disturbance may also be self-induced as in, for example, a fluid-structure interaction, resulting in a sustained large-amplitude motion, such as, for example, a limit cycle oscillation (hereinafter "LCO"). Generally, the LCO interferes with the performance of a primary role of the main structure. Three strategies for reducing the effect of the disturbance on the main structure are as follows: isolation which reduces the energy reaching the main structure from the disturbance; damping which dissipates the energy from the disturbance within the main structure; and absorption which removes the energy reaching the main structure from the disturbance via an auxiliary device.

Vibration isolation requires the main structure to be at least a single-degree-of-freedom system. An objective of vibration isolation is to reduce a natural frequency or frequencies of the main structure well below the lowest frequency of excitation. As a result, responses to disturbances are attenuated well above the highest natural frequency of interest. Vibration damping limits the magnitude of a resonant response in the steady-state and controls the peak response and decay rate in a transient state.

Vibration absorption requires a minimum of two degrees of freedom with one or more degrees of freedom constituting the main structure while another remaining degree of freedom is a vibration absorber. A passive vibration absorber is commonly known as a tuned mass damper, a passive mass damper, a tuned mass absorber and/or a passive mass absorber.

A harmonic disturbance is associated with a single frequency. The addition of a degree of freedom, such as, for example, the vibration absorber, may reduce and/or may attenuate a response of the main structure at or near the exciting frequency. Attaching a linear vibration absorber to the main structure and tuning the absorber such that its natural frequency is equal to the frequency of the excitation accomplishes the reduction and/or attenuation of the response of the main structure. A mass ratio between a mass of the absorber and a mass of the main structure is typically as small as possible.

When the frequency of the excitation is equal or nearly equal to the natural frequency of the linear vibration absorber, the response of the primary structure is small and the response of the linear vibration absorber is large. As a result, the response is localized to the linear vibration absorber at the driving frequency. However, near the two new natural frequencies of the main structure with the attached linear vibration absorber, the responses of the main structure and the linear vibration absorber are large.

An attenuation band between two resonant peaks is controlled by the mass ratio and damping coefficients of the main structure and the linear vibration absorber. Increased damping makes the main structure more robust to parametric variations and decreases the attenuation efficiency while a higher mass ratio broadens the attenuation band. The linear vibration absorber is primarily a steady-state device. The linear vibration absorber takes the energy input to the main structure at a single frequency and channels the energy to the linear vibration absorber. As a result, the linear vibration absorber protects the main structure. Small changes in the excitation frequency renders the device counter-productive if a new driving frequency is close to one of the two natural frequencies of the main structure and linear vibration absorber that bound the driving frequency.

For impulsive, wide-band loading, the linear vibration absorber has limited utility because the linear vibration absorber results in two resonant regions over which both the primary structure and the linear vibration absorber magnify the input. A nonlinear system can be exploited to improve performance of a vibration absorber beyond that of the linear system.

Nonlinear stiffness elements may improve attenuation characteristics of a vibration absorption system without increasing complexity and/or compromising economics. Nonlinear designs may be designed to give a spatial confinement or a localization and/or an energy pumping which enhances a capacity of the vibration absorption system to attenuate effects of unwanted broadband and/or narrowband disturbances. The energy pumping cannot be achieved by standard linear and/or nonlinear designs.

Other nonlinear vibration absorbers (hereinafter "NVAs") have been developed, but none were based on the energy pumping concept. Further, the effectiveness of the NVAs in a shock and/or a vibration isolation of a primary structure has been poor except over narrow frequency ranges. The NVAs are designed to operate near linearized natural frequencies or under conditions of an internal resonance between the natural frequencies of the primary structure. A local design of the NVAs is different from nonlinear energy pumping on which the present invention is based.

Therefore, a need exists for a device, a system and a method which transfers the energy from the main structure to a device and/or an attachment during transient resonance captures. A single resonance capture begins with the main structure vibrating at a large amplitude while a motion of a NES mass is comparatively small. However, even at small displacements, a essentially nonlinear spring connecting the NES mass to the primary structure provides some coupling. As a result, the energy begins to flow to the NES while the amplitude of the NES motion increases. The stiffness of the nonlinear spring depends on the deflection of the nonlinear spring. An amplitude and a frequency of NES motion will exist at which the NES can resonate with the main structure. As a result, an impedance match is achieved between the primary structure and the NES, and the energy flows readily into the NES with an attendant reduction in the energy and/or vibration of the primary structure. As the energy is dissipated in the NES by, for example, a passive damper, the amplitude of the NES motion diminishes and the resonance capture and/or corresponding impedance match are lost. As a result, the flow of energy between the primary structure and the NES is greatly reduced. The energy in the NES is confined therein and/or is prevented from returning to the main structure. The NES dissipates the energy trapped therein. Depending upon the dynamics of the primary system, another resonance capture may be reached, and previous scenario repeats.

The transient resonance captures are distinctly different from internal resonance in coupled undamped systems. The internal resonance is a steady state phenomenon that occurs between coupled nonlinear oscillators with no damping and typically results in nonlinear beating whereby the vibrational energy is continuously exchanged between the coupled oscillators. Hence, no irreversible transfer of energy from one oscillator to another oscillator occurs.

Furthermore, a need exists for a device, a system and a method which is an essentially nonlinear module or attachment for attenuating vibrations in main structures and/or structures subjected to dynamic loads, such as, for example, wide-band or narrow-band loads. The device, the system and the method absorbs, confines and dissipates the energy from vibrations in the main structure. The device is an advantage over the present state of the art because the device offers a protective solution for large scale, complex, flexible structures subjected to broad-band excitation.

Additionally, a need exists for a device, a system and a method for pumping vibrational energy from a main structure to the device or the attachment, the NES. Further, a need exists for a device, a system and a method for transferring vibrational energy rapidly from a main structure to the device or the attachment, the NES. Still further, a need exists for a device, a system and a method for dissipating energy confined within the device or the attachment, the NES. Moreover, a need exists for a device, a system and a method for protecting a primary structure by pumping energy from a main structure following a disturbance to the device or the attachment, the NES.

SUMMARY OF THE INVENTION

The present invention generally relates to a device, a system and a method for transferring and dissipating energy and/or controlling vibrations. Further, the present invention relates to a device, a system and a method for transferring and dissipating energy, such as, for example, vibrational energy from a primary structure to an essentially nonlinear energy sink (NES). More specifically, the present invention relates to a device, a system and a method for attenuating vibrations in main structures or primary structures subjected to dynamic loads generated by external disturbances, such as, for example, shocks, earthquakes, aerodynamic forces, fluid-structure interactions and/or the like. The NES protects the primary structure by rapidly pumping the energy and/or vibrations from the primary structure to the NES and/or dissipating the energy therefrom. The NES, though locally applied, modifies the global behavior of the combined primary structure-NES system.

A glossary providing definitions for pertinent terminology is as follows:

Active damper is defined as a device that requires an exogenous energy source and a control system to perform a function as a damper.

Active essentially nonlinear spring is defined as a device that requires an exogenous energy source and a control system to perform a function as an essentially nonlinear spring.

Dissipation is defined as an energy loss to an environment, usually in a form of heat.

Essential nonlinearity is defined as a characteristic behavior between two variables, one independent and another dependent, such that the dependent variable undergoes no change over some range of the independent variables in a neighborhood where a value of the independent variable is zero.

Essentially nonlinear spring is a compliant element for which a force-displacement relation is nonlinearizable. The complaint element is a spring which, for small displacements, exerts no force.

Geometrically nonlinear is defined as a demonstration of a nonlinear force-displacement relation as a result of large configuration changes, such as, for example, the lines of action of internal forces during deformation.

Impedance is defined as a frequency-dependent property of a system or a structure that incorporates a mass, a damping and a stiffness and reflects a compliance of the system or the structure under a harmonic loading.

Irreversible transfer of vibrational energy is defined as a one-way movement of energy from a primary system or a primary structure to a module or an attachment.

Mass and/or inertia is defined as a property of matter that causes the matter to resist motion.

Modular is defined as a fully self-contained structure having external connection only to the vibrating primary structure.

Narrow-band is defined as occurring over a small range of frequencies. A sinusoid is an ideal narrow-band signal with energy only at the frequency of oscillation of the sinusoid.

Nearly essential nonlinearity is defined as a characteristic behavior between two variables, one independent and another dependent, such that the dependent variable undergoes negligible change over some range of the independent variables in a neighborhood where a value of the independent variable is zero.

Non-smooth force-displacement relationship is defined as a force-displacement relationship with one or more kinks, jumps or breaks within a specified range of application.

A primary system or a primary structure is defined as a system or a structure which seeks protection and may be simple or complex and linear or nonlinear.

Order of magnitude change is defined as a difference in integer parts of a base 10 logarithm of each of two numbers.

Passive damper is defined as a damping device, such as, for example, a viscous device, a frictional device and/or the like. The passive damper requires no exogenous energy source to perform a function of the damping device.

Passive essentially nonlinear spring is defined as an essentially nonlinear spring that requires no exogenous energy source to perform a function of the essentially nonlinear spring.

Protection of a structure is defined as a reduction of a vibratory response thereby increasing an operating life of the structure.

Rapid transfer of vibrational energy is defined heuristically as moving energy from a primary system or a primary structure to a module or an attachment over a time scale defined by a relatively small number of cycles of vibration of the primary system or the primary structure.

Resonance capture is defined as a dynamic phenomenon whereby a nonlinear attachment momentarily "locks" in an impedance match with a primary system or a primary structure to which the nonlinear attachment is attached. In essence, resonance capture is a situation when an instantaneous frequency of oscillation of the nonlinear attachment "locks" in resonance with a multiple or a fraction of a resonant frequency of the primary system or the primary structure.

Resonance capture cascade is defined as a series of resonance captures each occurring at a different frequency, usually at or near a resonant frequency of the primary system or structure.

Resonant frequency is defined as a frequency associated with a mass and a linearized stiffness of a system or a structure at which the system or the structure will vibrate if transiently excited.

Slope of the force-displacement relation is defined as a change in force per unit change in displacement.

Smooth force-displacement relation is defined as a force-displacement relationship without kinks, jumps or breaks within a specified range of application.

Vibration control is defined as employing some means to reduce, or at least bound, an amplitude of vibration of a system or a structure. Prevailing methods of the vibration control include vibration isolation, vibration damping, and/or vibration absorption.

Wide-band is defined as occurring over a broad range of frequencies. An impulse is an ideal wide-band signal with equal energy at all frequencies from zero to infinity.

To this end, in an embodiment of the present invention a vibration control device is provided. The device has a mass and means for dissipating energy wherein the means for dissipating energy is attached to the mass and the structure. Further, the device has a spring wherein the spring is essentially nonlinear wherein the spring is attached to the mass and the structure and further wherein the energy is irreversibly transferred from the structure to the device and is dissipated therein.

In an embodiment, the spring has a smooth force-displacement relation or a non-smooth force displacement relation.

In an embodiment, the device may be modular, an attachment to the structure or integral with the vibrating system or structure.

In an embodiment, the spring is nonlinearizable at a zero displacement condition due to the slope of a force-displacement characteristic being zero at that point.

In an embodiment, the spring is linearizable at a zero displacement condition due to the slope of the force-displacement characteristic being non-zero at a point.

In an embodiment, a stiffness of the spring at the zero displacement condition is orders of magnitude smaller than the stiffness of the spring at displacements comparable to a resonance capture between the vibration control device and the structure wherein linearized dynamics of the vibration control device are at a zero displacement condition or near the zero displacement condition and do not appreciably affect dynamics of the interaction between the vibration control device and the structure during the resonance capture.

In another embodiment of the present invention, device for attracting, absorbing and dissipating vibrational energy in a primary system or primary structure is provided. The device has an essentially nonlinear subsystem wherein the subsystem or substructure attaches to the primary system or primary structure or is integral to the primary system or the primary structure.

In an embodiment, the subsystem engages in a resonance capture at one or more resonant frequencies of the primary system or the primary structure.

In an embodiment, the subsystem transiently exhibits dynamic properties matching dynamic properties of the primary system or the primary structure.

In an embodiment, the subsystem freely draws the vibrational energy from the primary system or the primary structure therein when the subsystem transiently exhibits dynamic properties matching dynamic properties of the primary system or the primary structure.

In an embodiment, the subsystem is locally applied to the primary system or primary structure and modifies global dynamic properties of the primary system or the primary structure for the purpose of promoting vibrational energy imparted to the primary system or the primary structure to pass one-way and irreversibly to the device and reducing or eliminating the response of the primary system or primary structure.

In an embodiment, the device has an integral damping element attached between the subsystem and primary system or primary structure wherein the integral damping element dissipates sufficient vibrational energy to cause a mismatch in dynamic properties between the subsystem and the primary system or the primary structure and precludes remaining vibrational energy from freely flowing outward from the subsystem to the primary system or the primary structure.

In an embodiment, the subsystem sequentially seeks resonant frequencies of the primary system or the primary structure wherein the subsystem engages in a resonance capture with each resulting in resonance capture cascading.

In another embodiment of the present invention, an essentially nonlinear device for transferring energy from a structure is provided. The device has a mass and an essentially nonlinear spring extending from the mass wherein the spring is attached to the structure. Further, the device has a damping device connected to the mass and to the structure wherein the damping device has a variable and controllable dissipation rate wherein the damping device requires an external power source and dissipates the energy.

In an embodiment, the energy is dissipated by a combination of a passive means and an active means.

In another embodiment of the present invention, an essentially nonlinear device is provided. The device has a mass and an actuator connected to the mass. Further, the device has a control system connected to the actuator and an energy source capable of producing an essentially nonlinear behavior wherein the energy source is connected to the control system.

In an embodiment, the essential nonlinearity behavior is achieved by a combination of a passive means and an active means.

In another embodiment of the present invention, a method for transferring energy from a structure is provided. The method has the step of providing a device having an essentially nonlinear spring, a damper and a mass wherein the essentially nonlinear spring and the damper is connected to the mass. Further, the method has the steps of connecting the device to the structure with the essentially nonlinear spring and the damper and pumping the energy from the structure to the device via the essentially nonlinear spring and the damper wherein the pumping of the energy to the device is one-way and irreversible.

In an embodiment, the method has the step of absorbing the energy from the structure with the device.

In an embodiment, the method has the step of dissipating the energy from the structure with the device.

In an embodiment, the method has the step of integrally forming the structure with the device.

In an embodiment, the method has the step of making the damper integral to the device.

In an embodiment, the method has the step of eliminating the energy from the structure.

In an embodiment, the method has the step of engaging in resonance capture with a resonant frequency of the structure with the device.

In an embodiment, the method has the step of transiently matching impedances of the device and the structure.

In an embodiment, the method has the step of transiently changing the impedance of the device to preclude the energy from flowing from the device to the structure.

It is, therefore, an advantage of the present invention to provide a device, a system and a method for transferring energy which allows the energy to be pumped from a primary structure to the NES.

Another advantage of the present invention is to provide a device, a system and a method for transferring energy which provides the NES to pump energy from a primary structure to the NES.

And, another advantage of the present invention is to provide a device, a system and a method for transferring energy which protects a primary structure by pumping the energy from the primary structure to the NES.

Yet another advantage of the present invention is to provide a device, a system and a method for transferring energy which provides the NES to dissipate the energy and/or the vibrations confined therein.

A further advantage of the present invention is to provide a device, a system and a method for transferring energy which provides the NES to rapidly transfer the energy from a primary structure to the NES.

Moreover, an advantage of the present invention is to provide a device, a system and a method for transferring energy which provides the NES that does not require connection to a ground.

And, another advantage of the present invention is to provide a device, a system and a method for transferring energy which provides irreversible transfer of the energy from a primary structure to the NES.

Yet another advantage of the present invention is to provide a device, a system and a method for transferring energy which improves vibration and/or shock attenuation in the primary structure following externally induced disturbances.

Another advantage of the present invention is to provide a device, a system and a method for transferring energy which provides spatial localization of response due to disturbances of a primary structure to the NES.

Yet another advantage of the present invention is to provide a device, a system and a method for transferring energy over a broad-band of frequencies to the NES.

A still further advantage of the present invention is to provide a device, a system and a method for transferring energy which provides the NES which has an essential non-linearity with respect to a primary structure.

Moreover, an advantage of the present invention is to provide a device, a system and a method for transferring energy which reduces response due to seismic shock in buildings, bridges and/or other civil engineering infrastructures.

And, another advantage of the present invention is to provide a device, a system and a method for transferring energy which provides a base isolation system for a building, a bridge and/or another civil engineering infrastructure.

Yet another advantage of the present invention is to provide a device, a system and a method for transferring energy which allows a transient disturbance to be dissipated via the NES.

A further advantage of the present invention is to provide a device, a system and a method for transferring energy which provides vibration suppression across a broadband of frequencies.

Moreover, an advantage of the present invention is to provide a device, a system and a method for transferring energy which allows nonlinear energy sinks to be applied to more than one floor of a building to dissipate response due to a seismic shock.

A further advantage of the present invention is to provide a device, a system and a method for transferring energy which modifies the global dynamics of the primary system or primary structure, which may result in stabilization of the system and reduction and/or elimination of, for example, limit cycle oscillations typical of self-excited systems, such as, for example, aircraft in flight, pipes with internal fluid flows and/or the like.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
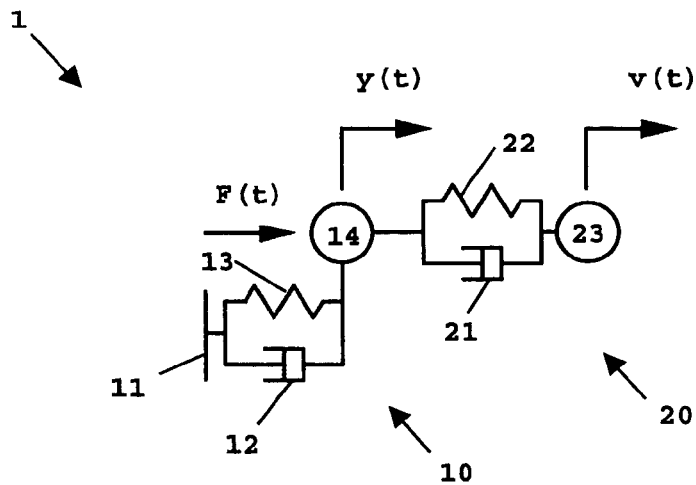
FIG. 1 is a schematic diagram of a two-degree-of-freedom system with a single-degree-of-freedom primary structure and an essential nonlinear energy absorbing device in an embodiment of the present invention.

The present invention generally relates to a device, a system and a method for transferring energy from a primary structure to a nonlinear energy sink (hereinafter "NES"). More specifically, the present invention relates to a device, a system and a method for energy absorption, dissipation and resulting vibration attenuation in primary systems and primary structures. The device, the system and the method are based on nonlinear energy pumping. Nonlinear energy pumping is a one-way, passive or active, irreversible transfer of vibrational energy initiated by an exogenous disturbance, such as, for example, a narrow-band force, a wide-band force and/or a system of forces, to a priori assigned modules or nonlinear attachments, such as, for example, the NES. The energy confined in the NES is thereby efficiently dissipated. A transient resonance capture governs and/or controls the nonlinear energy pumping. An instantaneous frequency of oscillation of the nonlinear attachment locks in resonance with an integer multiple of, or with a rational fraction of a resonant frequency of the primary system or the primary structure. As a result, energy is permitted to flow from the primary system or primary structure to the nonlinear attachment or the NES.

The present invention represents a new method for energy absorption and/or dissipation with a direct application to vibration attenuation and/or shock isolation in primary structures. The present invention differs from any other known devices in the field in concept and/or in the use of an essentially nonlinear stiffness element as a means for achieving the nonlinear energy pumping. The use of nonlinear energy pumping manifested through an entirely modular nonlinear energy sink to achieve the shock isolation and/or the vibration attenuation is completely new and cannot be considered as an improvement to any existing apparatus, device, product, system, process, method and/or composition of matter.

The present invention generally relates to a device, a system and a method for transferring energy. More specifically, the present invention relates to a device, a system and a method for transferring energy, such as, for example, vibrational energy from a system or structure to an attachment or module. The attachment or module is essentially nonlinear and may be the NES. Attachment of the NES to a primary system or structure allows the vibrational energy to be irreversibly transferred from the primary system or the primary structure to the NES. As a result, the NES promotes attenuation of vibrations in the primary system or the primary structure caused by external disturbances, such as, for example, wide-band disturbances and/or narrow-band disturbances.

The primary system or the primary structure exhibits resonant frequencies, often called resonances. The NES has no inherent resonant frequency due to an essential nonlinearity of the NES. Excitement of the primary system or the primary structure with sufficient energy causes the vibrational energy to flow to the NES which undergoes resonance capture with the primary system or the primary structure. The impedance of the NES then matches the impedance of the primary system or the primary structure. As a result, the vibrational energy flows to the NES until sufficient vibrational energy is dissipated by the NES causing an impedance mismatch which prevents the vibrational energy from flowing back to the primary system or the primary structure. This is energy pumping which is the one way, irreversible transfer of the vibrational energy from the primary system or the primary structure to an NES. As a result, the NES protects the primary system or the primary structure by pumping the vibrational energy from the primary system or the primary structure to the NES where it is eventually dissipated.

As the primary system or the primary structure exhibits more than one resonant frequency, the NES undergoes resonance capture at one resonant frequency, during which energy is pumped to the NES until the resonance capture is lost. The NES then inherently seeks another resonant frequency, engages in another resonance capture until insufficient vibrational energy remains in the primary system or the primary structure to promote additional resonance captures with the NES. This process of sequential, multiple resonance captures is referred to as resonance capture cascading.

An objective of the energy pumping by an addition of the NES to the primary system or the primary structure is a rapid, one-way, irreversible and nearly complete transfer of the vibrational energy from the primary system or the primary structure, subjected to the wide-band or narrow-band excitation, to the NES where the vibrational energy is dissipated. As a result, vibrations in the primary system or the primary structure are attenuated thereby protecting the primary system or the primary structure from damage by the vibrations.

Referring now to the drawings wherein like numerals refer to like parts, FIG. 1 illustrates a schematic of a two-degree-of-freedom system 1. The system 1 has a primary linear oscillator 10 and a nonlinear energy sink 20 (hereinafter "NES 20"). The primary linear oscillator 10 is a single-degree-of-freedom oscillator. The primary linear oscillator 10 is connected to a ground 11. The primary linear oscillator 10 has a spring 13, a viscous damper 12 and/or a quantity of matter, such as, for example, mass 14. The mass 14 is, for example, a rigid mass. Further, the mass 14 may be, for example, a plate, a disk, a cube and/or the like. The mass 14 may be made from a material, such as, for example, steel, plastic, fiberglass, wood, cement and/or the like. The present invention should not be deemed as limited to the embodiments of a specific material of the mass 14.

The NES 20 is, for example, an essentially nonlinear attachment. The NES 20 has a spring 22, viscous damper 21 and/or a quantity of matter, such as, for example, a mass 23. The mass 23 is, for example, a rigid mass. Further, the mass 23 may be, for example, a plate, a disk, a cube and/or the like. The mass 23 may be made from a material, such as, for example, steel, plastic, fiberglass, wood, cement and/or the like. The present invention should not be deemed as limited to the embodiments of a specific material of the mass 23.

Here, the excitation given by F(t) may be impulsive and, thus, ideally a wide-band excitation. The mass 23 may be small with respect to the mass 14. The absolute displacement of the mass 14 is given by y(t), and the absolute displacement of the mass 23 is given by v(t). The spring 13 connecting the mass 14 to the ground 11 is linear and the viscous damper 12 connects the mass 14 to the ground 11 in parallel with the spring 13. The spring 22 is an ideal, smooth, essentially nonlinear spring with stiffness characteristic $Cu^3$. The spring 22 connects the mass 14 to the mass 23 and $u(t)=y(t)-v(t)$. The viscous damper 21 connects the mass 23 to the mass 14 in parallel with the essentially nonlinear spring 22. The excitation F(t) is applied directly to the primary structure and/or the primary linear oscillator 10 with both the mass 14 and the mass 23 initially at rest.

An impulsive excitation of small magnitude applied to the mass 14 may result in an insignificant transfer of the vibrational energy to the NES 20, comprised of the mass 23, the essentially nonlinear spring 22, and the viscous damper 21. However, impulsive excitations of higher magnitude applied to the mass 14 may cause a significant transfer of the energy to the NES 20, which engages in a 1:1 resonance capture with the primary linear oscillator 10, given by the mass 14, the viscous damper 12 and the spring 13, at which time, an instantaneous resonant frequency of the NES 20 is approximately equal to the resonant frequency of the primary linear oscillator 10. An impedance match occurs between the primary linear oscillator 10 and the NES 20. As a result, the vibrational energy flows one-way and irreversibly to the NES 20 until there is adequate energy loss due to dissipation in the NES 20 to cause the NES 20 to escape the capture. Therefore, the vibrational energy is contained within the NES 20 and/or is eventually dissipated therein.

Certain periodic orbits are termed special orbits and are of particular importance in terms of irreversible energy transfer from the primary linear oscillator 10 to the NES 20. The special orbits correspond to all initial conditions equal to zero with the exception of the initial velocity of the primary linear oscillator 10. These initial conditions are identical to the initial conditions of the system 1 immediately after the primary linear oscillator 10 is excited by an impulsive force.

Specific special orbits are localized at the NES 20 and correspond to large-amplitude oscillations of the NES 20 and to simultaneous small-amplitude oscillations of the primary linear oscillator 20. This implies that, if the system 1 is forced impulsively and one of the localized special orbits is excited, motion is rapidly and passively transferred from the primary linear oscillator 10 to the NES 20. Therefore, the impulsive excitation of a special orbit may be a triggering mechanism for the initiation of the energy pumping.

The ability of the NES 20 to transfer the energy from the primary linear oscillator 10 to the NES 20 has been demonstrated through numerical simulation and physical experiments. The simulations were used to compute a portion of total input energy applied by an external impulse to the primary linear oscillator 10, which is eventually dissipated by a dashpot of the NES 20. A series of simulations were performed with parameters $\epsilon=0.05$, $\epsilon\lambda=0.01$, $\omega_0^2=1$, $C=1$, $F(t)=Y\delta(t)$ and zero initial conditions. Impulsive excitation of magnitude Y was applied directly to the mass 14.

Figure 2:
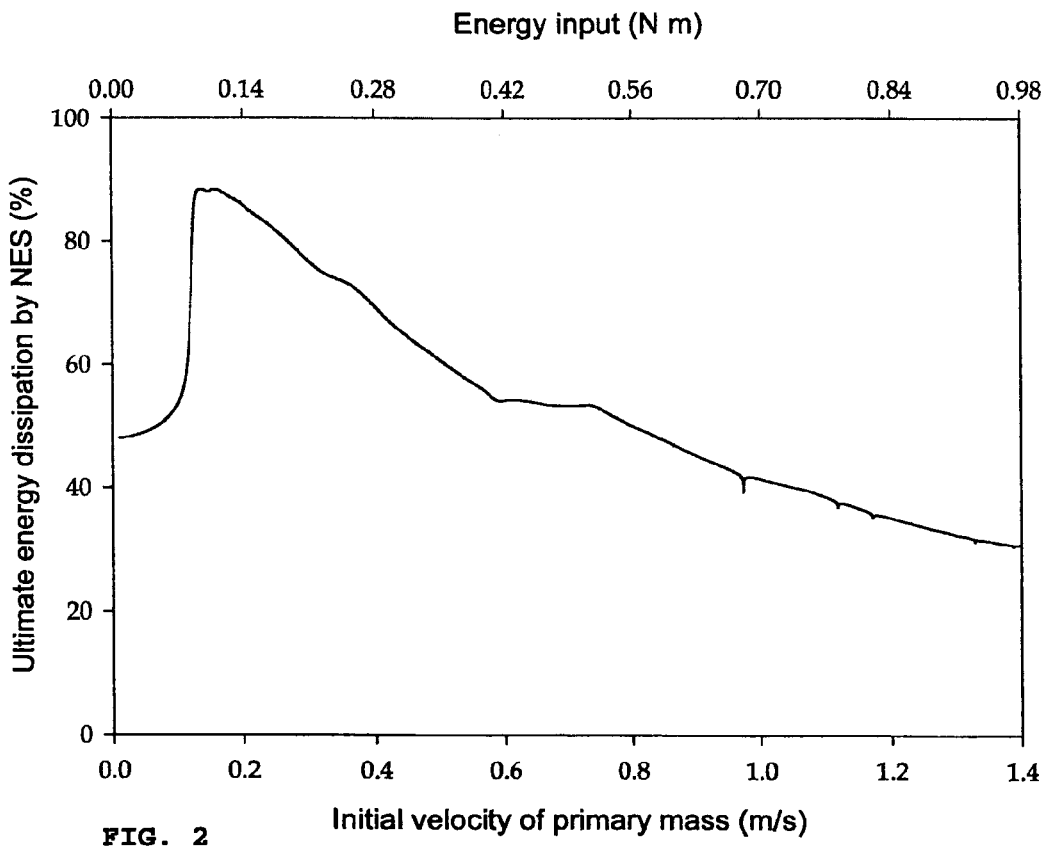
FIG. 2 is a graph of a percentage of total input energy dissipated at the essential nonlinear absorbing device of FIG. 1 as a function of the total input energy in an embodiment of the present invention.

FIG. 2 illustrates a graph of a percentage of total input energy dissipated at the NES 20 and is shown as a function of the total input energy. This measure quantifies the energy transfer from the primary linear oscillator 10 to the NES 20. The total energy dissipated approaches a maximum percentage, such as, for example, ninety percent.

Figure 3A:
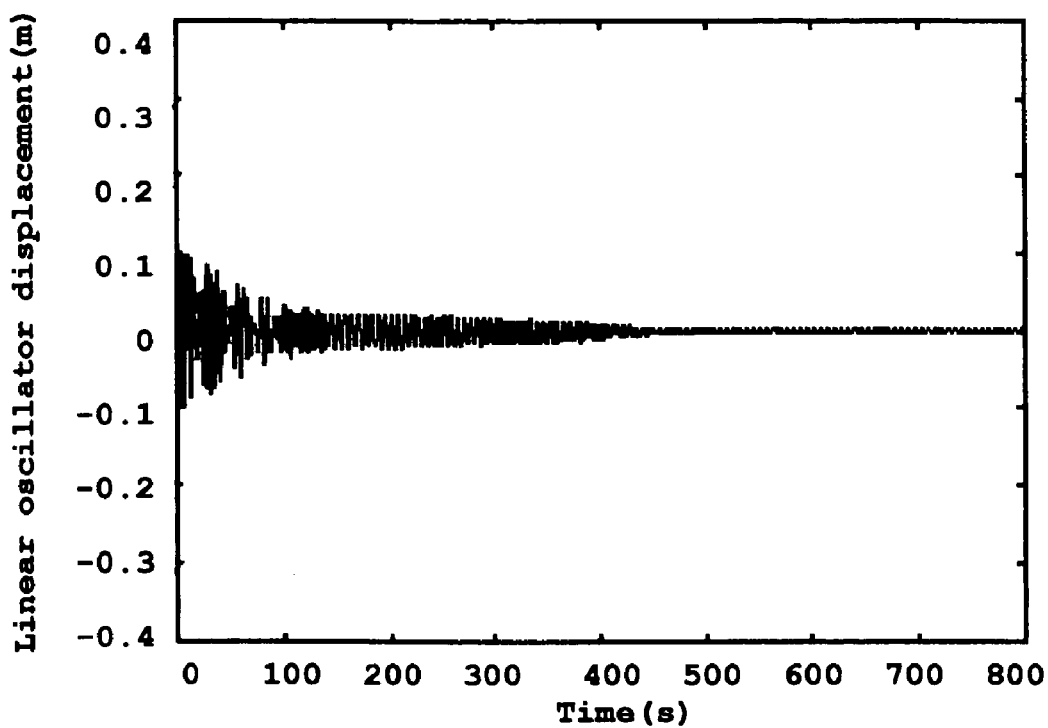
FIG. 3a is a graph of linear oscillator displacement-time for the transient responses of the primary structure of FIG. 1 in an embodiment of the present invention.
Figure 3B:
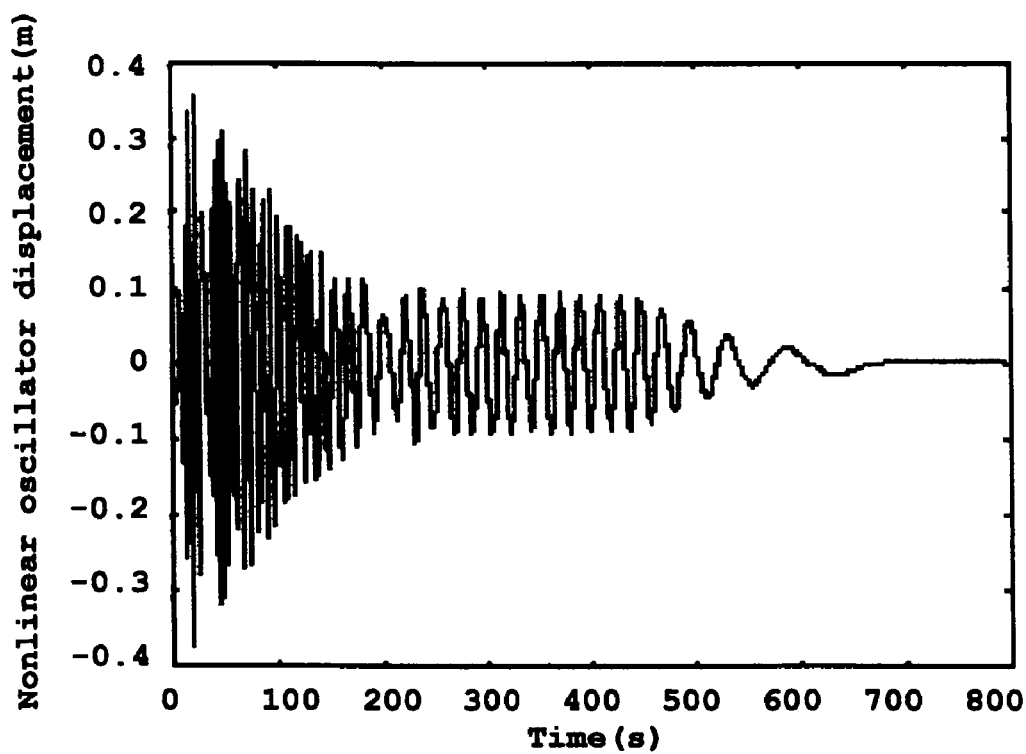
FIG. 3b is a graph of linear oscillator displacement-time for the transient responses of the essential nonlinear energy absorbing device of FIG. 1 in an embodiment of the present invention.

FIGS. 3a and 3b illustrate transient responses of the primary linear oscillator 10 and the NES 20, respectively, which are depicted for parameters $\epsilon=0.05$, $\epsilon\lambda=0.0015$, $\omega_0^2=1$, $C=1$, $F(t)=-0.1039\delta(t)$, with removal of the viscous damper 12 of the primary linear oscillator 10. Energy pumping to the NES 20 is realized, as evidenced by the small amplitude of oscillation of the primary linear oscillator 10 as shown in FIG. 3a with respect to the large amplitude of oscillation of the NES 20 as shown in FIG. 3b.

In the event that the primary structure possesses multiple resonant frequencies and associated modes of vibration, a broadband disturbance may excite more than one of these modes to undesirably large amplitudes. It is an advantage of the NES 20 that the NES 20 can interact with several modes of the primary structure in sequence and extract the vibrational energy from the primary structure. A sequence of extractions from several modes is called a resonance capture cascade and is demonstrated by using a system consisting of a 2-degree-of-freedom linear oscillator and an NES 20. This is the simplest structural system capable of exhibiting a cascade response.

Figure 4:
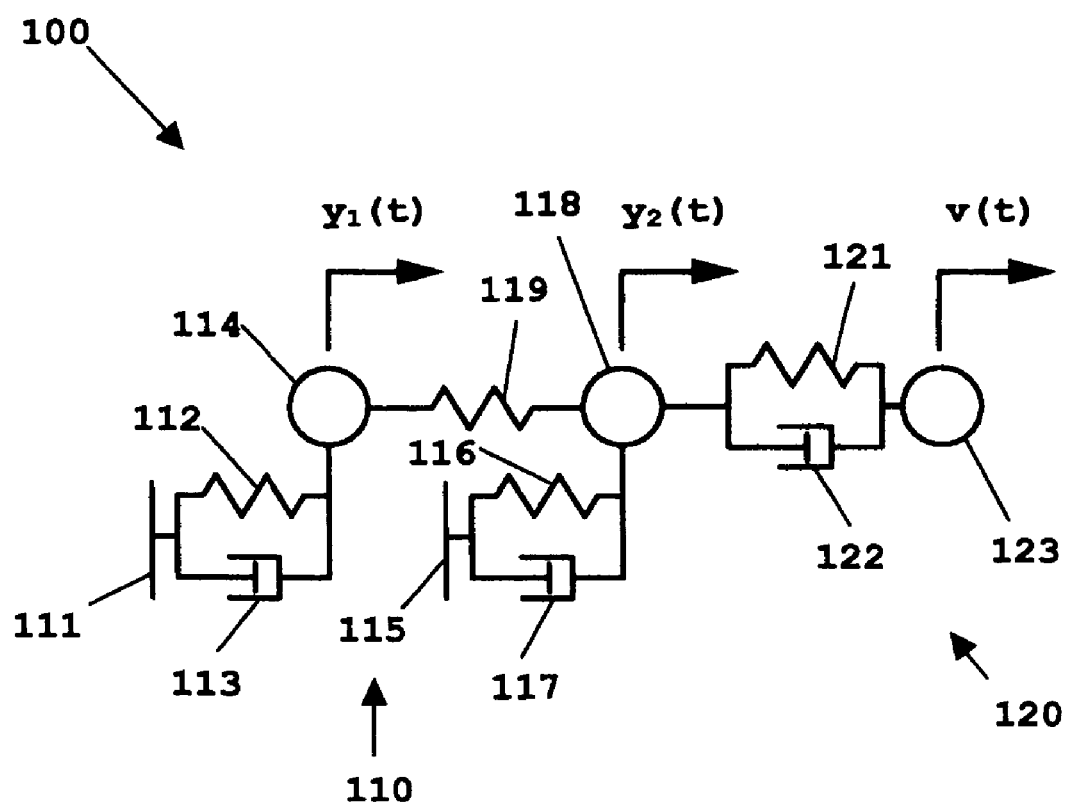
FIG. 4 is a schematic diagram of a multi-degree-of-freedom linear system with an essential nonlinear energy absorbing device attached thereto in an embodiment of the present invention.

FIG. 4 illustrates a multi-degree-of-freedom system 100 with the NES 20. The multi-degree-of-freedom system 100 has a 2-degree-of-freedom linear system 110 (hereinafter "2DOF system 110") with the NES 120 in an embodiment of the present invention. For simulation purposes, the parameter values $\omega_0^2=136.9$, $\lambda=0.155$, $\bar{\lambda}=0.544$, $d=1.2\times10^3$, $\epsilon=1.8$, and $C=1.63\times10^7$ are assumed which correspond to the following two linear natural frequencies for the primary structure: $\omega_1=11.68$ rad/sec and $\omega_2=50.14$ rad/sec. The 2DOF system 110 is the primary structure, for example, a ground 111 and/or a ground 115. The 2DOF system 110 may have viscous dampers 113, 117 and/or linear springs 112, 116 and/or masses 114, 118, and is connected to ground 111 and/or ground 115. The masses 114, 118 are, for example, rigid masses. Further, the masses 114, 118 may be, for example, plates, disks, cubes, a combination thereof and/or the like. The masses 114, 118 may be made from a material, such as, for example, steel, plastic, fiberglass, wood, cement and/or the like. The present invention should not be deemed as limited to the embodiments of a specific material of the masses 114, 118.

The NES 120 is, for example, an essentially nonlinear attachment. The NES 120 has a spring 121, viscous damper 122 and/or a quantity of matter, such as, for example, a mass 123. The spring 121 is an essentially nonlinear spring. The mass 123 is, for example, a rigid mass. Further, the mass 123 may be, for example, a plate, a disk, a cube and/or the like. The mass 123 may be made from a material, such as, for example, steel, plastic, fiberglass, wood, cement and/or the like. The present invention should not be deemed as limited to the embodiments of a specific material of the mass 23.

The 2DOF system 110 is attached to the ground 111 via the linear spring 112 and the viscous damper 113 and/or is attached to the ground 115 via the linear spring 116 and the viscous damper 117. The mass 114, the linear spring 112, viscous damper 113 and/or the ground 111 is connected to the mass 118, the linear spring 116, the viscous damper 117 and/or the ground 115 via a spring 119. The NES 120 is attached to the 2DOF system 110 via the essentially nonlinear spring 121 and the viscous damper 122 of the NES 120. Furthermore, the NES 120 is connected to the masses 114, 118, the linear springs 112, 116, the viscous dampers 113, 117, the ground 111 and/or the ground 115 via the essentially nonlinear spring 121 and the viscous damper 122 of the NES 120.

Here, the excitation given by F(t) may be impulsive and, thus, ideally a wide-band excitation. The mass 123 may be small with respect to the masses 114, 118. The absolute displacement of the masses 114, 118 is given by $y_1(t)$ and $y_2(t)$, respectively, and the absolute displacement of the mass 123 is given by v(t). The spring 119 and the essentially nonlinear spring 121 connects the masses 114, 118 to the mass 123 where $u(t)=v(t)-y_2(t)$. The excitation F(t) is applied directly to the 2DOF system 110 with the masses 112, 118 and the mass 123 initially at rest.

Impulsive excitations of small magnitude are applied to the masses 112, 118, respectively may result in an insignificant transfer of the vibrational energy to the NES 120. However, impulsive excitations of higher magnitude applied to the masses 112, 118 may cause a significant transfer of the energy to the NES 120, which engages in a 1:1 resonance capture with one and/or both modes of vibration of the 2DOF system 110, at which time, an instantaneous resonant frequency of the NES 120 is approximately equal to a resonant frequency of the 2DOF system 110. An impedance match occurs between the 2DOF system 110 and the NES 120. As a result, the vibrational energy flows one-way and irreversibly to the NES 120 until there is adequate energy loss due to dissipation in the NES 120 to cause the NES 120 to escape the capture. Therefore, the vibrational energy is contained within the NES 120 and/or is eventually dissipated therein.

Figure 5A:
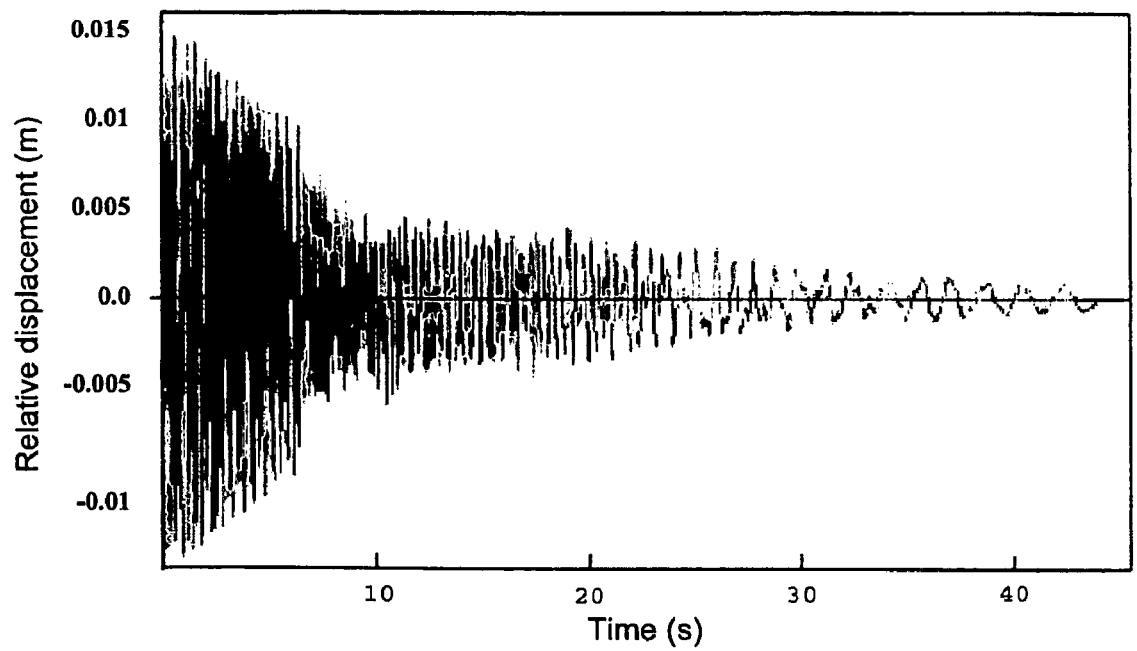
FIG. 5a is a graph of relative transient response-time for the two-degree-of-freedom linear system of FIG. 4 without the essential nonlinear attachment in an embodiment of the present invention.

FIG. 5a illustrates a graph of relative transient response (time history) for the system without the NES 120 in an embodiment of the present invention. Further, FIG. 5a illustrates a relative response $v(t)-y_0(t)$ of the system 100 for initial displacements $y_0(0)=0.01$, $y_1(0)=v(0)=-0.01$ and zero initial velocities.

Figure 5B:
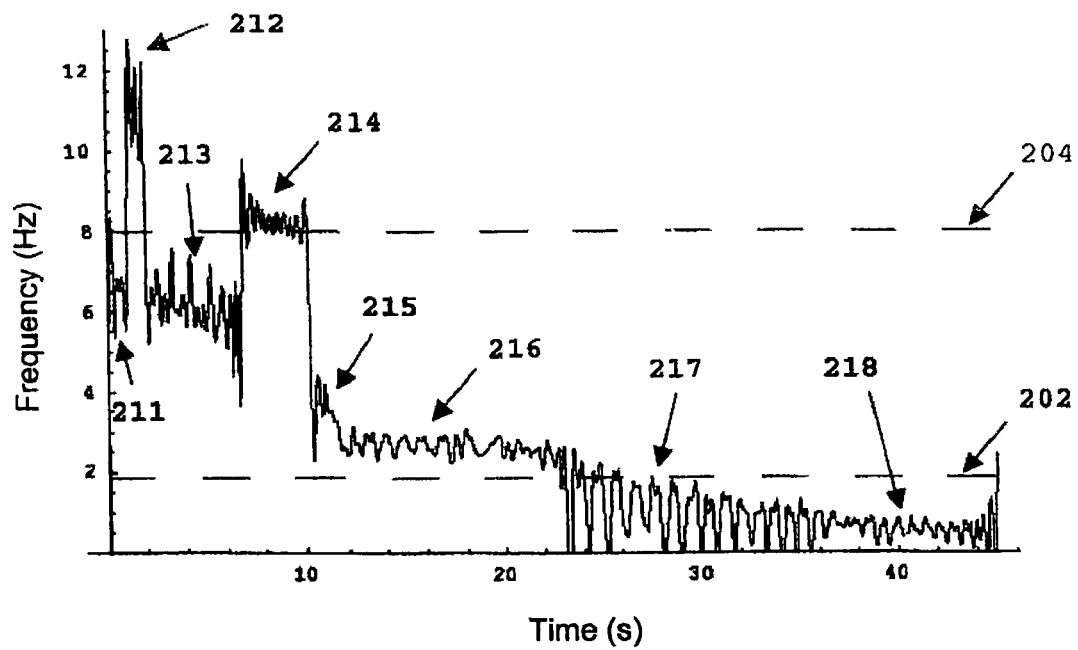
FIG. 5b is a graph of instantaneous frequency-time for the essential nonlinear attachment of FIG. 4 in an embodiment of the present invention.

FIG. 5b illustrates a graph of instantaneous frequency content of a transient response of the NES 120. Dashed line 202 represents the lower linear natural frequency and dashed line 204 represents the higher linear natural frequency. Ranges 211, 212, 213, 215, 216, 218 represent strong nonlinear interactions of the NES 120 with different low-frequency and high-frequency nonlinear modes of the system 100. Range 214 represents a resonance capture with the linearized in-phase mode of primary linear oscillator 110. Range 217 represents a resonance capture with the linearized out-of-phase mode of the primary linear oscillator 110. As the energy decreases due to damping, a series of eight resonance captures is observed.

During each resonance capture the NES 20 passively absorbs energy from the nonlinear mode involved before escape from resonance capture occurs and the NES 120 transiently resonates with the next mode in the series. The NES 120 acts as a passive, broadband boundary controller, by, for example, absorbing, confining and/or eliminating the vibrational energy from the primary linear oscillator 110. The capacity of the NES 120 to engage in the resonance captures with the multiple linear modes and the nonlinear modes in different frequency ranges is caused by the essential nonlinearity of the NES 120; the absence of a linear term in the stiffness characteristic precludes any preferential resonant frequency.

An example of this phenomenon occurs with primary structures with more than two degrees of freedom which include continuous structures with infinitely many degrees of freedom. A broadband disturbance typically imparts energy to multiple modes of the primary structure whereby a single NES 20 can extract the energy from multiple modes at differing resonant frequencies. The mechanics of an interaction of the NES 20 with each mode is essentially the same as the mechanics of an interaction of an NES 20 with a single-degree-of-freedom primary structure as described above.

The NES 20 has an ability to absorb energy from a sequence of vibratory modes at differing frequencies which is an important advantage of the NES 20. It follows from an ability of the NES 20 to engage in transient resonant capture with the primary structure and/or the primary linear oscillator 10 at an arbitrary frequency. As a result, the ability of the NES 20 to absorb energy from a sequence of vibratory modes at differing frequencies depends upon the essentially and/or nearly essentially nonlinear force-displacement characteristic of the stiffness of the spring 22 of the NES 20.

Figure 6:
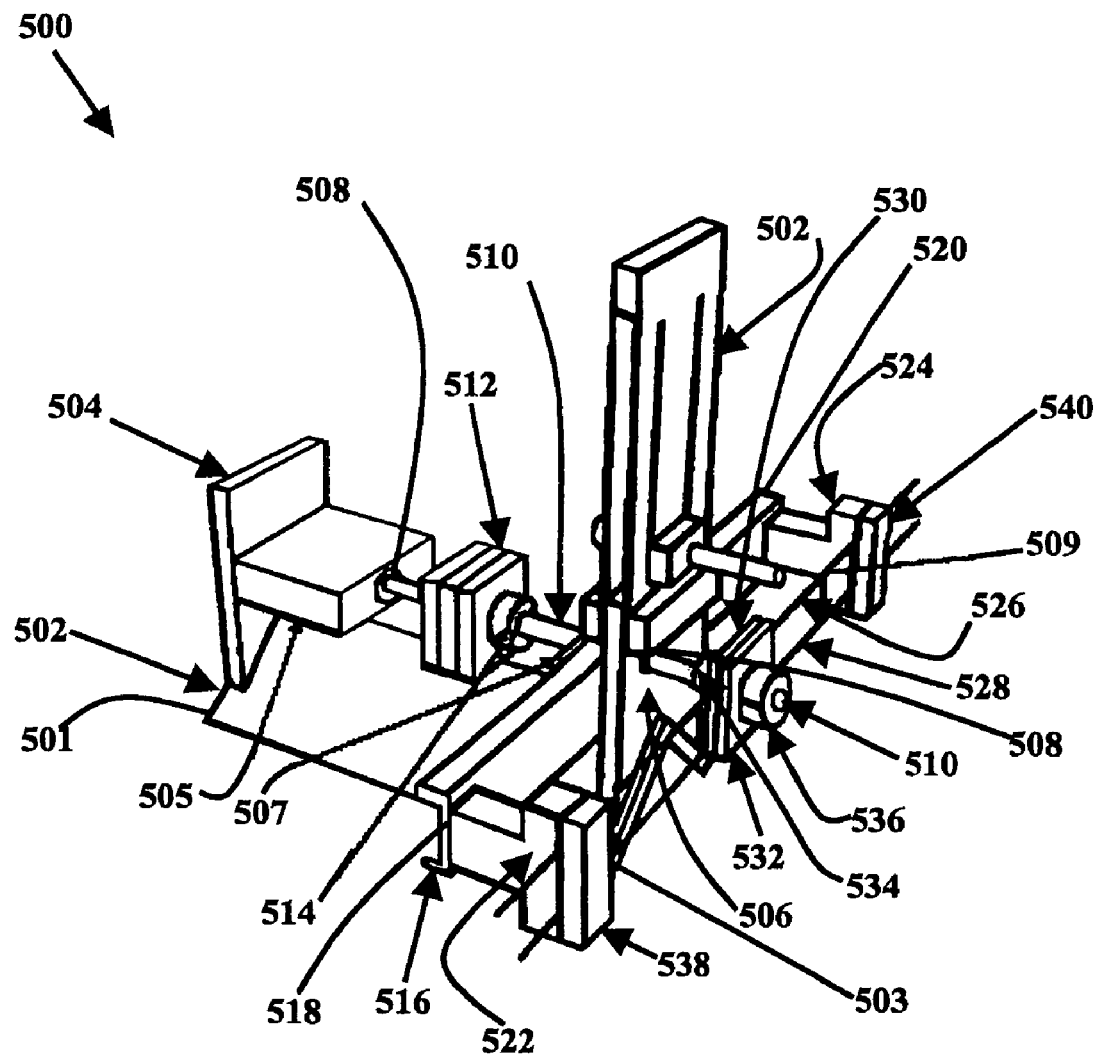
FIG. 6 is a perspective view of a nonlinear energy sink attached to a primary structure in an embodiment of the present invention.

FIG. 6 illustrates a nonlinear energy sink 500 (hereinafter "NES 500") which may be attached to a primary structure 502 or the primary linear oscillator 10 in an embodiment of the present invention. The primary structure 502 has a first end 501 and/or a second end 503. The first end 501 is opposite to the second end 503. The primary structure 502 may be, for example, a piece of material, such as, for example, aluminum, steel, cement, wood and/or the like. The primary structure 502 may be, for example, on top of a horizontal air track (not shown in the drawings). Further, the primary structure 502 may support the NES 500 and/or may constrain the NES 500. Moreover, the primary structure 502 may be, for example, the primary linear oscillator 10 and/or the like. The present invention should not be deemed as limited to the embodiments of a specific material of the primary structure 502.

The NES 500 is connected to the ground 11 with, for example, a leaf spring 504 as shown in FIG. 6. The leaf spring 504 is, for example, a linear spring, such as, for example, the spring 13 of the primary linear oscillator 10 and/or the like. The leaf spring 504 has a grounding bolt 509 thereon. The grounding bolt 509 attaches to the ground 11. As a result, the NES 500 is a single-degree-of-freedom (SDOF) structure which may oscillate along, for example, a line parallel to the primary structure 502. A first upright 504 is attached to the first end 501 of the primary structure 502. A second upright 506 is attached to the second end 503 of the primary structure 502.

A first bearing block 505 is attached to the first upright 504. A second bearing block 507 is attached to the second upright 506. The first bearing block 505 extends inward with respect to the second upright 506. The second bearing block 507 extends inward with respect to the first upright 504. The first bearing block 505 and/or the second bearing block 507 is interposed between the first upright 504 and the second upright 506. Each of the first bearing block 505 and/or the second bearing block 507 have a passage 508 therein. The passage 508 has, for example, a ball bearing therein.

As illustrated in FIG. 6, the first bearing block 505 and/or the second bearing block 507 may be, for example, substantially parallel to the primary structure 502. The linear leaf spring 504 is attached to the second upright 506 of the primary structure 502. As a result, the linear leaf spring 504 is connected to the primary structure 502 via the second upright 506.

A shaft 510 extends from the first upright 504 to the second upright 506. The shaft 510 passes through the passage 508 of the first bearing block 505 and/or the second bearing block 507. As a result, the shaft 510 may be, for example, substantially parallel to the primary structure 502. Further, the shaft 510 extends through the second upright 506 outward with respect to the primary structure 502.

A mass 512 is connected to the shaft 510 via a mass retaining collar 514. Still further, the mass 512 is interposed between the first upright 504 and the second upright 506. The mass retaining collar 514 constrains the mass 512 to the shaft 510 and/or connects the mass 512 to the primary structure 502. The mass 512 is, for example, the mass 23 or the NES 20. The mass 512 may be, for example, a plate, a disk, a cube and/or the like. The mass 512 may be made from a material, such as, for example, steel, plastic, fiberglass, wood, cement and/or the like. The present invention should not be deemed as limited to the embodiments of a specific material of the mass 512.

A support beam 516 is attached to the second upright 506 as shown in FIG. 6. The support beam 516 has a first end 518 and/or a second end 520. The first end 518 is opposite to the second end 520. The support beam 516 is interposed between the first upright 504 and the second upright 506. The support beam 516 is adjacent to the leaf spring 502. Further, the shaft 510 extends through the support beam to the second upright 506. A first support block 522 and a second support block 524 are attached to the first end 518 and the second end 520, respectively, of the support beam 516. The first support block 522 and the second support block 524 extend outward with respect to the primary structure 502.

A first clamp plate 530 and/or a second clamp plate 532 is connected to the shaft 510. A first retaining collar 534 and/or a second retaining collar 536 is attached to the shaft 510. The first clamp plate 530 and/or the second clamp plate 532 is interposed between the first retaining collar 534 and the second retaining collar 536.

A first wire 526 and/or a second wire 528 extend from the first support block 522 to the second support block 524. The first wire 526 and/or the second wire 528 extend between the first clamp plate 530 and the second clamp plate 532. A first support cover 538 is attached to the first support block 522. The first wire 526 and/or the second wire 528 is interposed between the first support cover 538 and the first support block 522. As a result, the first wire 526 and/or the second wire 528 is attached to the first support block 522.

A second support cover 540 is attached to the second support block 524. The first wire 526 and/or the second wire 528 is interposed between the second support cover 540 and the second support block 524. As a result, the first wire 526 and/or the second wire 528 is attached to the second support block 524. The first wire 526 and/or the second wire 528 is connected to the support beam 516 and/or the primary structure 502 via the support blocks 522, 524 and/or the support covers 538, 540. Further, the first wire 526 and/or the second wire 528 is connected to the shaft 510 and/or the mass 512 via the clamp plates 530, 532 and/or the retaining collars 534, 536.

The NES 500 of FIG. 6 includes the shaft 510, the mass 512, the first wire 526 and/or the second wire 528. The NES 500 may be an essentially nonlinear spring, such as, for example, the NES 20. The wires 526, 528 are deflected by motion of the shaft 510 with respect to the primary structure 502. The wires 526, 528 provide, for example, a cubic nonlinear restoring force. Further, the support blocks 522, 524 may be moved along the support beam 516. As a result, the stiffness of the essentially nonlinear spring may be increased or decreased.

The primary structure 502 may be excited by a broadband force. The broadband may be applied to the first upright 504 at the first end 501 opposite the leaf spring 502. The broadband force induces energy in the primary structure 502. As a result, the primary structure 502 may vibrate. The energy of the primary structure 502 is passively or actively absorbed by the NES 500 via the shaft 510, the mass 512 and the wires 526, 528. The energy of the primary structure 502 is transferred to the NES 500 or the mass 512, the shaft 510 and the wires 526, 528. As a result, the energy causes the mass 512 and/or the shaft 510 to move in a direction which may be substantially parallel to the primary structure 502. Further, the energy is dissipated from the primary structure via the NES 500 or the shaft 510, the mass 512 and/or the wires 526, 528. This dissipation may be due to viscous losses in the shaft bearings or may occur primarily in a dashpot or other damper (not shown in the drawing) connected between the shaft 510 and the upright 504, for example.

Figure 7:
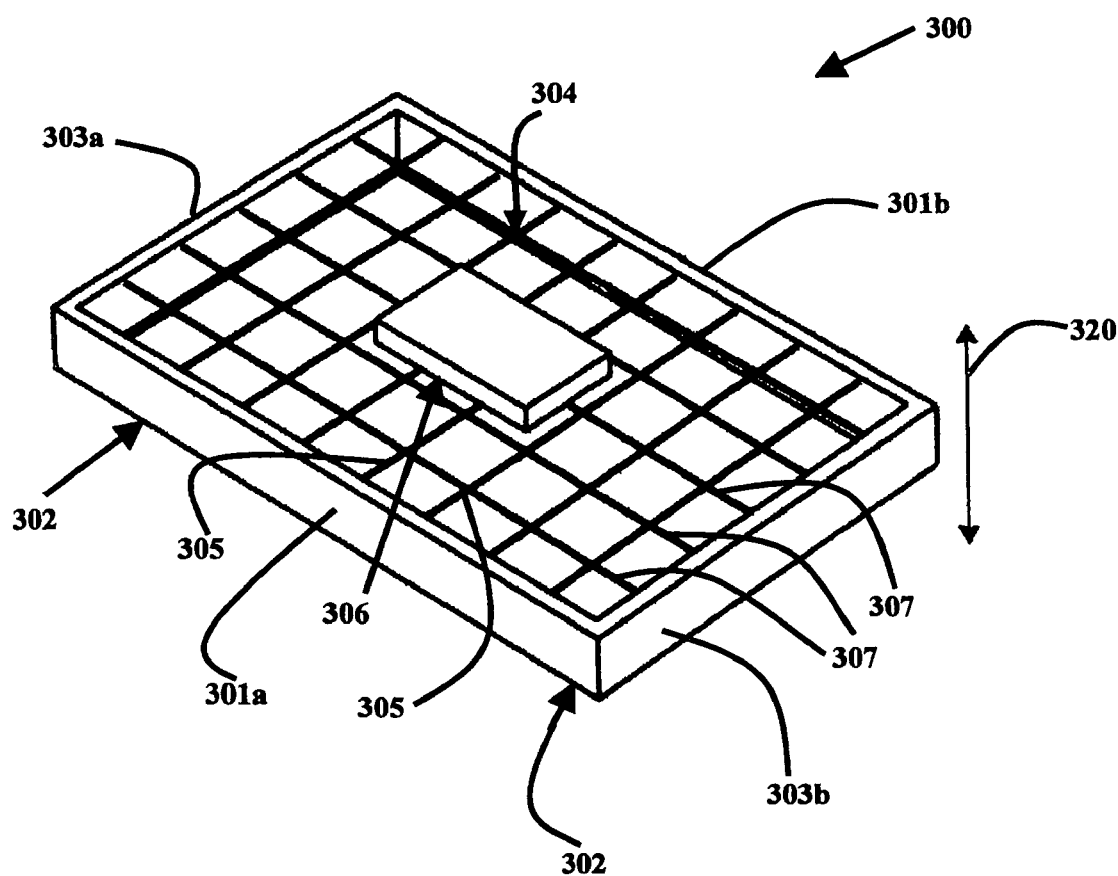
FIG. 7 is a perspective view of a nonlinear energy sink in an embodiment of the present invention.

FIG. 7 illustrates a nonlinear energy sink 300 (hereinafter "NES 300") in an embodiment of the present invention. The NES 300 has a frame 302, a wire mesh 304 and/or a rigid mass 306. The mass 306 may be, for example, a plate, a disk, a cube and/or the like. The rigid mass 306 may be made from a material, such as, for example, steel, plastic, fiberglass, wood, cement and/or the like. The present invention should not be deemed as limited to the embodiments of a specific material of the mass 306.

The rigid mass 306 is attached to the wire mesh 304. The rigid mass 306 is, for example, centered on the wire mesh 304 with respect to the frame 302. As a result, the rigid mass 306 is connected to the frame 302 via the wire mesh 304. The NES 300 may be, for example, the NES 20. As a result, the wire mesh 304 is, for example, the spring 22. Further, the rigid mass 306 may be, for example, the mass 23.

The frame 302 has vertical walls 301a, 301b and/or horizontal walls 303a, 303b. The wire mesh 304 has a plurality of vertical wires 305 and/or a plurality of horizontal wires 306. The plurality of vertical wires 305 extend from the vertical wall 301a to the vertical wall 301b. The plurality of horizontal wires 307 extend from the horizontal wall 303a to the horizontal wall 303b. As a result, the frame 302 constrains the wire mesh 304. Moreover, the plurality of vertical wires 305 may be, for example, substantially perpendicular with respect to the plurality of horizontal wires 307. Moreover, geometrically nonlinear transverse deformation of the wire mesh 304 provides an essentially nonlinear or a nearly essentially nonlinear coupling between the mass 306 and the primary structure.

The frame 302 is attached to a primary structure (not shown in the drawings), such as, for example, the primary linear oscillator 10 and/or the like. The wire mesh 304 is undeformed when at rest and/or may be substantially parallel to the structure. The wire mesh 304 is stretched by the rigid mass 306 when the rigid mass 306 vibrates with respect to the frame 302. Further, the rigid mass 306 has a direction of motion 320. The direction of motion 320 may be, for example, along a normal with respect to the wire mesh 304 and/or the frame 302.

As the broadband force is applied to the primary structure, the primary linear oscillator 10 and/or the frame 302, the broadband force induces energy in the primary structure, the primary linear oscillator 10 and/or the frame 302. As a result, the primary structure, the ground 11, the primary linear oscillator 10 and/or the frame 302 vibrates. The energy of the primary structure, the primary linear oscillator 10 and/or the frame 302 is absorbed by the NES 300 via the wire mesh 304 and the rigid mass 306. The energy of the primary structure, the primary linear oscillator 10 and/or the frame 302 is transferred to the NES 300 via the wire mesh 304 and/or the rigid mass 306. As a result, the vibrational energy causes the rigid mass 306 to move in the direction of motion 320. The vibrational energy is dissipated from the primary structure, the primary linear oscillator 10 and/or the frame 302 via the wire mesh 304 and/or the rigid mass 306. Energy transferred to the NES 300 may be ultimately dissipated, for example, through the displacement of air or another surrounding fluid by the motion of the mass 306 and/or the wire mesh 304, and/or through frictional losses (e.g., rubbing) at the wire interfaces.

Figure 8:
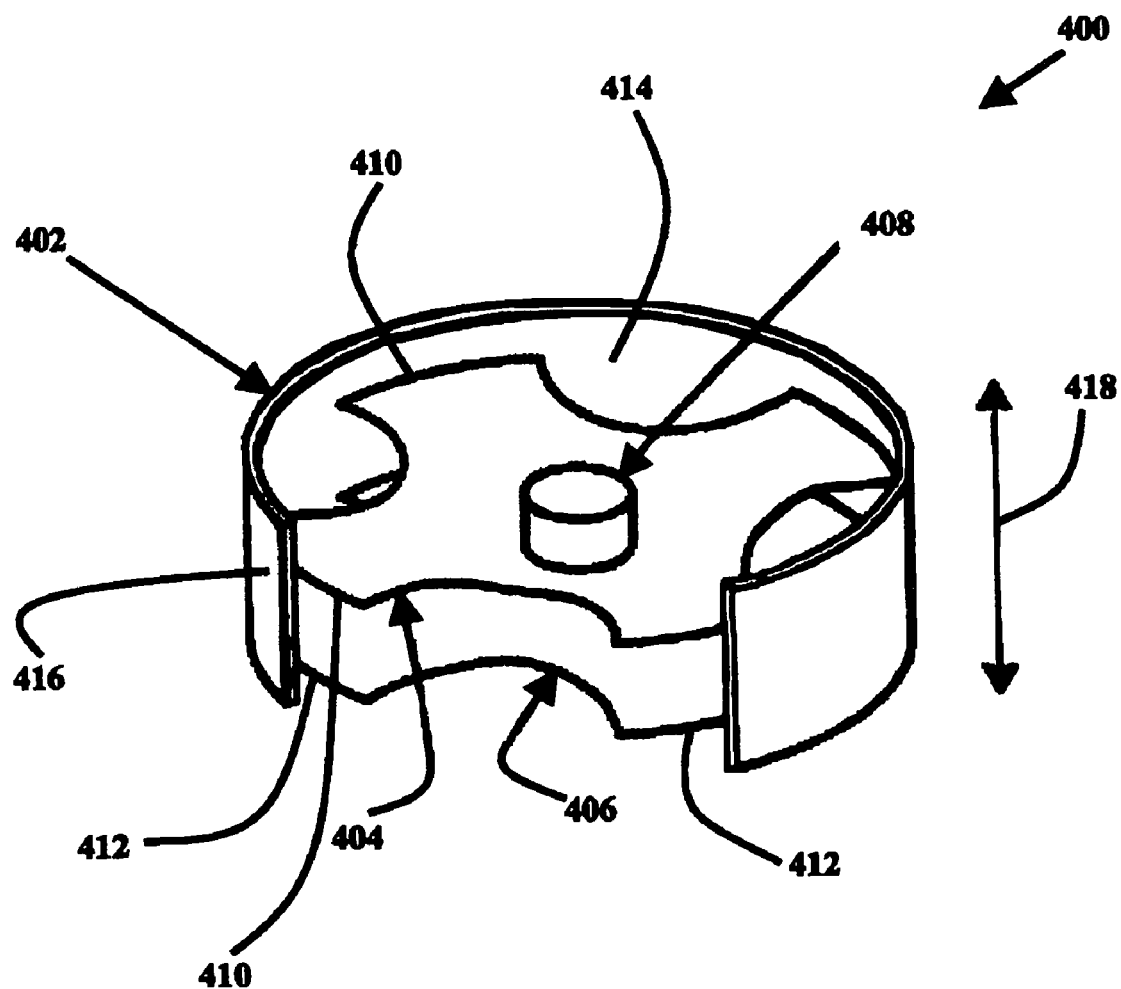
FIG. 8 is a cross-sectional perspective view of a nonlinear energy sink in an embodiment of the present invention.

FIG. 8 illustrates a nonlinear energy sink 400 (hereinafter "NES 400") in an embodiment of the present invention. Further, the NES 400 has a cylinder 402, a first plate 404, a second plate 406 and/or a rigid mass 408. The cylinder 402 has an interior surface 414 and/or an exterior surface 416. The interior surface 414 is opposite to the exterior surface 416. Still further, the NES 400 may be, for example, the NES 20. As a result, the cylinder 402 may be the primary linear oscillator 10. The rigid mass 408 may be, for example, a plate, a disk, a cube and/or the like. The rigid mass 408 may be made from a material, such as, for example, steel, plastic, fiberglass, wood, cement and/or the like. The present invention should not be deemed as limited to the embodiments of a specific material of the mass 408.

The first plate 404 and/or the second plate 406 may have a shape, such as, for example, a circle. The first plate 404 and the second plate 406 have outer edges 410, 412, respectively. The first plate 404 is connected to the second plate 406. Further, the first plate 404 is buckled against the second plate 406. Further, the first plate 404 and the second plate 406 may be the spring 22 of the NES 20.

The rigid mass 408 is connected to the first plate 404. The cylinder 402 is mounted to the primary structure, the primary linear oscillator 10 and/or the like. The outer edges 410, 412 of the first plate 404 and the second plate 406, respectively, contact the interior surface 414 of the cylinder 402. As a result, the cylinder 402 constrains the first plate 404 and the second plate 406 within the cylinder 402. The rigid mass 408, the first plate 404 and/or the second plate 406 have a direction of motion 418. The direction of motion 418 may be substantially parallel with respect to the cylinder 402. A nonlinear stiffness of the NES 400 is achieved by a radially preloaded, initial deformation of the first plate 404 and the second plate 406.

As the broadband force is applied to the cylinder 402 and/or the flat plate, the broadband force induces energy in the cylinder 402 and/or the flat plate. As a result, the cylinder 402 and/or the flat plate vibrate. The energy of the cylinder 402 and/or the flat plate is absorbed by the NES 400 via the first plate 404, the second plate 406 and/or the rigid mass 408. The energy of the cylinder 402 and/or the flat plate is transferred to the first plate 404, the second plate 406 and/or the rigid mass 408. As a result, the energy causes the rigid mass 408 to move in the direction of motion 418. The energy is dissipated from the cylinder 402 and/or the flat plate via the first plate 404, the second plate 406 and/or the rigid mass 408. Energy transferred to the NES 400 may be ultimately dissipated, for example, through the displacement of air or another surrounding fluid by the motion of the mass 408 and/or the plates 404, 406, and/or through frictional losses (e.g., rubbing) at the interfaces of the plates, mass and/or cylinder.

Figure 9:
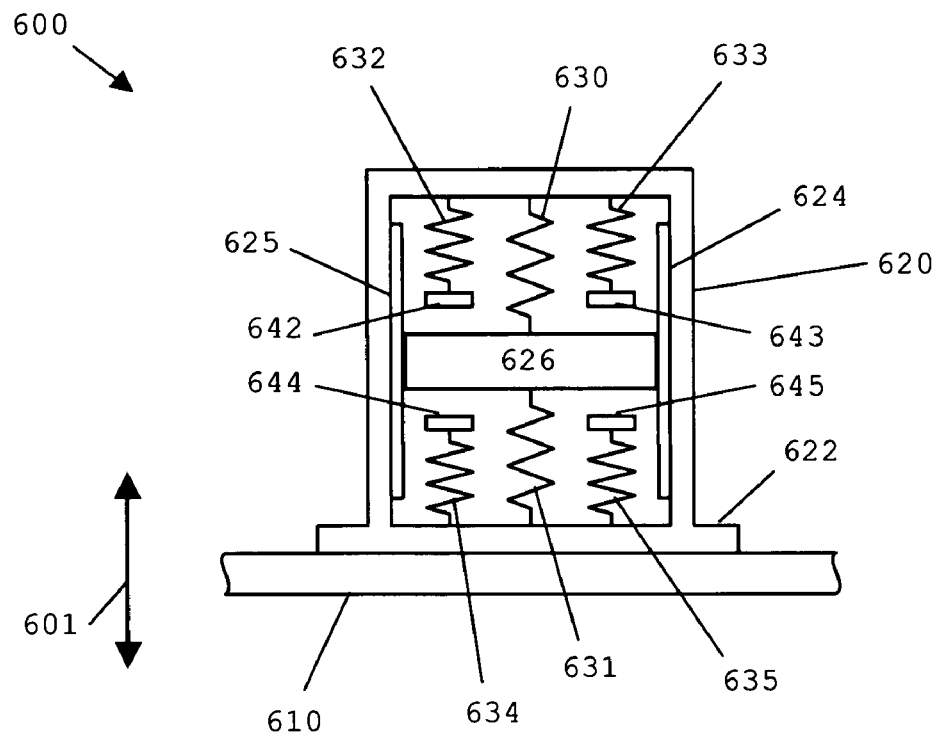
FIG. 9 is a schematic diagram of a nonlinear energy sink having multiple linear springs which are used to achieve a piecewise-linear, but overall nearly essentially or essentially nonlinear, coupling stiffness in an embodiment of the present invention.

FIG. 9 illustrates a nonlinear energy sink 600 (hereinafter "NES 600") in an embodiment of the present invention. Further, the NES 600 has a housing 620, a mounting flange 622, guides 624, 625 and/or a nonlinear energy sink mass 626 (hereinafter "NES mass 626"). The guides 624, 625 connect the NES mass 626 to the housing 620 and constrain the NES mass 626 inside of the housing 620. The NES 600 is attached to a primary structure 610 via the mounting flange 622. The NES mass 626 may be, for example, a plate, a disk, a cube and/or the like. The NES mass 626 may be made from a material, such as, for example, steel, plastic, fiberglass, wood, cement and/or the like. The present invention should not be deemed as limited to the embodiments of a specific material of the mass 626.

Weak linear centering springs 630, 631 are interposed between the NES mass 626 and the housing 620. Strong linear springs 632, 633, 634, 635 are attached to the housing 620 and do not contact the NES mass 626 inside of the housing 620. The strong linear springs 632, 633, 634, 635 have caps 642, 643, 644, 645, respectively. The NES mass 626 will only contact the strong linear springs 632, 633, 634, 635 after the NES mass 626 is displaced across a gap from equilibrium. The weak linear centering springs 630, 631 are used to establish a nominal static equilibrium position of the NES mass 626 with respect to the housing 620. If the weak linear centering springs 630, 631 are weak compared to the strong linear springs 632, 633, 634, 635, a piecewise linear stiffness characteristic of the NES 600 is nearly essentially nonlinear. As a result the NES 600 is simple and easy to control the nonlinear stiffness through selection of the strong linear springs 632, 633, 634, 635 and adjustment of the gaps.

As the broadband force is applied to the housing 620 and/or the primary structure 610, the broadband force induces energy in the housing 620 and/or the primary structure 610. As a result, the housing 620 and/or the primary structure 610. The energy of the housing 620 and/or the primary structure 610 is absorbed by the NES 600 via NES 600, the weak linear centering springs 630, 631 and/or the strong linear springs 632, 633, 634, 635. The energy of the primary structure 610 and/or the housing 620 is transferred to the weak linear centering springs 630, 631 and/or the strong linear springs 632, 633, 634, 635. As a result, the energy causes the NES mass 626 to move in the direction of motion 601. The energy is dissipated from the primary structure 610 and/or the housing 620 via the NES mass 626, the weak linear centering springs 630, 631 and/or the strong linear springs 632, 633, 634, 635. Energy transferred to the NES 600 may be ultimately dissipated, for example, through the displacement of air or another surrounding fluid by the motion of the NES mass 626, the weak linear centering springs 630, 631 and/or the strong linear springs 632, 633, 634, 635.

Figure 10:
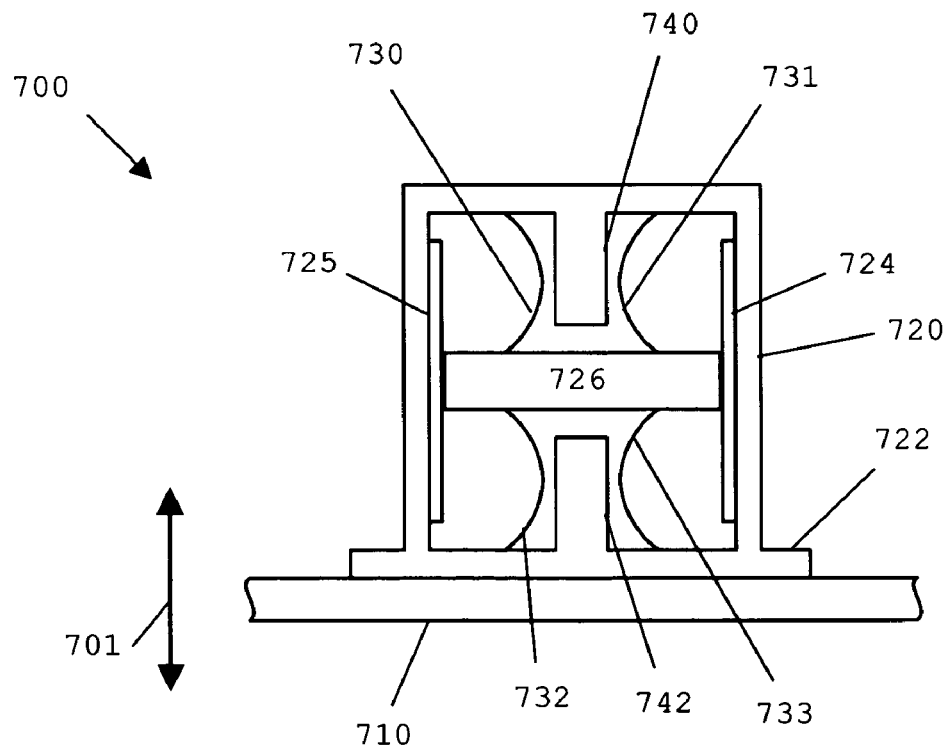
FIG. 10 is a schematic diagram of a nonlinear energy sink having buckled columns which serve as nearly essentially or essentially nonlinear springs in an embodiment of the present invention.

FIG. 10 illustrates a nonlinear energy sink 700 (hereinafter "NES 700") in an embodiment of the present invention. Further, the NES 600 has a housing 720, a mounting flange 722, guides 724, 725 and/or a nonlinear energy sink mass 726 (hereinafter "NES mass 726"). The guides 724, 725 connect the NES mass 726 to the housing 720 and constrain the NES mass 726 inside of the housing 720. The NES 700 is attached to a primary structure 710 via the mounting flange 722. The NES mass 726 may be, for example, a plate, a disk, a cube and/or the like. The NES mass 726 may be made from a material, such as, for example, steel, plastic, fiberglass, wood, cement and/or the like. The present invention should not be deemed as limited to the embodiments of a specific material of the mass 726.

Buckled columns 730, 731, 732, 733 are interposed between the NES mass 726 and the housing 720. The buckled columns 730, 731, 732, 733 act as, for example, nonlinear springs. Stoppers 740, 742 are inside the housing 720 and enhance a hardening of the buckled columns 730, 731, 732, 733. A stiffness of each of the buckled columns 730, 731, 732, 733 is small until the lateral motion of each of the buckled columns 730, 731, 732, 733 contacts one of the stoppers 740, 742 attached to the housing 720. The stiffness of each of the buckled columns 730, 731, 732, 733 is immediately increased and results in a nearly essential nonlinearity similar to that achieved in the NES 600. Columns have been used in a similar manner to create compact nonlinear springs, but not with the intention of creating a nearly essential nonlinearity.

As the broadband force is applied to the housing 720 and/or the primary structure 710, the broadband force induces energy in the housing 720 and/or the primary structure 710. As a result, the housing 720 and/or the primary structure 710. The energy of the housing 720 and/or the primary structure 710 is absorbed by the NES 700, the stoppers 740, 742 and/or the buckled columns 730, 731, 732, 733. The energy of the primary structure 710 and/or the housing 720 is transferred to the buckled columns 730, 731, 732, 733. As a result, the energy causes the NES mass 726 to move in the direction of motion 701. The energy is dissipated from the primary structure 710 and/or the housing 720 via the NES mass 726, the stoppers 740, 742 and/or the buckled columns 730, 731, 732, 733. Energy transferred to the NES 700 may be ultimately dissipated, for example, through the displacement of air or another surrounding fluid by the motion of the NES mass 726 and/or the buckled columns 730, 731, 732, 733.

Figure 11:
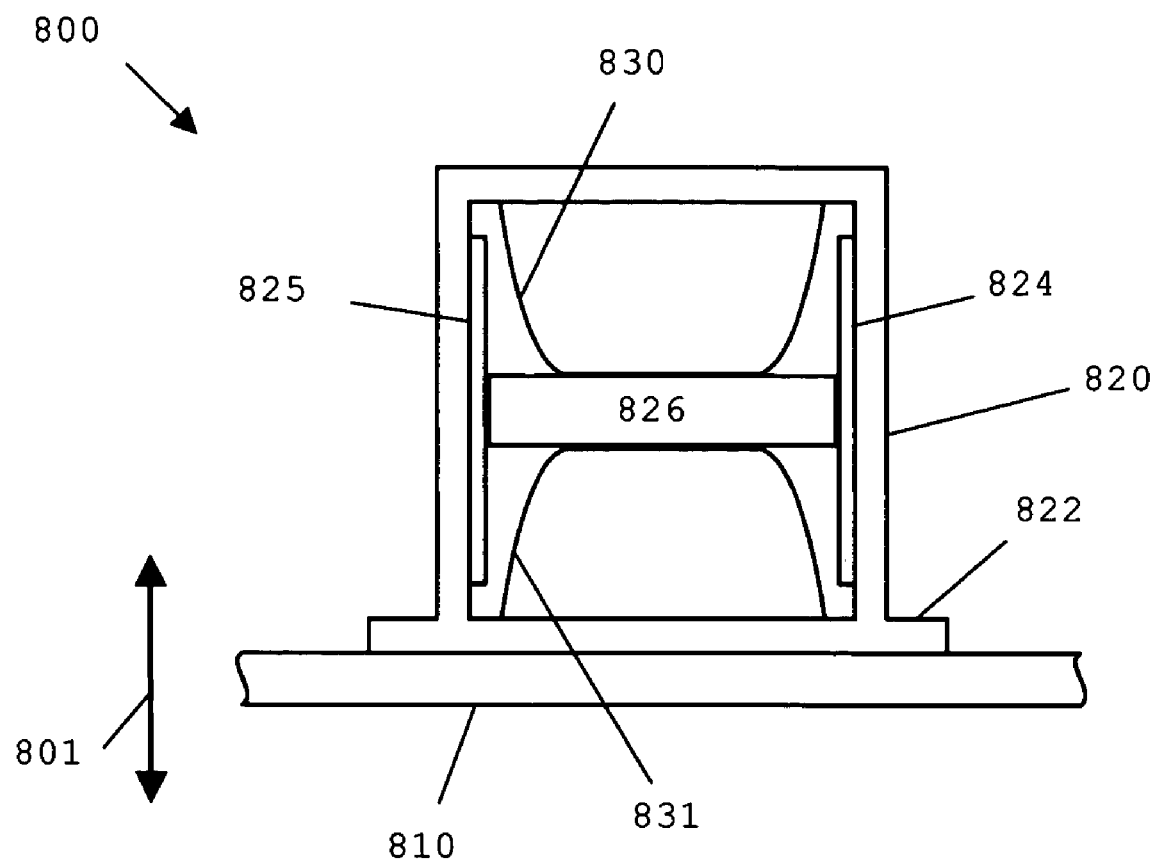
FIG. 11 is a schematic diagram of a nonlinear energy sink having nearly essential or essential nonlinearity which is achieved by a variation in effective spring length that accompanies displacement of the sink mass in an embodiment of the present invention.

FIG. 11 illustrates a nonlinear energy sink 800 (hereinafter "NES 800") in an embodiment of the present invention. Further, the NES 800 has a housing 820, a mounting flange 822, guides 824, 825 and/or a nonlinear energy sink mass 826 (hereinafter "NES mass 826"). The guides 824, 825 connect the NES mass 826 to the housing 820 and constrain the NES mass 826 inside of the housing 820. The NES 800 is attached to a primary structure 810 via the mounting flange 822. The NES mass 826 may be, for example, a plate, a disk, a cube and/or the like. The NES mass 826 may be made from a material, such as, for example, steel, plastic, fiberglass, wood, cement and/or the like. The present invention should not be deemed as limited to the embodiments of a specific material of the mass 826.

Springs 830, 831 are interposed between the NES 826 and the housing 820. The springs 830, 831 may be deformed by a motion of the NES 826. Each of the springs 830, 831 thae the form of a "loop" anchored at two points to two points inside of the housing 820. Each of the springs 830, 831 contact the mass over a region which varies as the NES mass 826 moves. Because the springs 830, 831 are a constant length, a free length between the housing 820 and the NES mass 826 changes with displacement of the NES 826. As a result, a nonlinear stiffness characteristic is produced. An advantage of the NES 800 is that the design is simplicity of construction, achieved at a cost of greater design effort compared to the NES 600.

As the broadband force is applied to the housing 820 and/or the primary structure 810, the broadband force induces energy in the housing 820 and/or the primary structure 810. As a result, the housing 820 and/or the primary structure 810. The energy of the housing 820 and/or the primary structure 810 is absorbed by the NES 800 and/or the springs 830, 831. The energy of the primary structure 810 and/or the housing 820 is transferred to the springs 830, 831. As a result, the energy causes the NES mass 826 to move in the direction of motion 801. The energy is dissipated from the primary structure 810 and/or the housing 820 via the NES mass 826 and/or the springs 830, 831. Energy transferred to the NES 800 may be ultimately dissipated, for example, through the displacement of air or another surrounding fluid by the motion of the NES mass 826 and/or the springs 830, 831.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for transferring energy from a structure, the method comprising the steps of:
providing an essentially nonlinear spring that has a force-displacement relation that is substantially nonlinearizable wherein the essentially nonlinear spring exerts substantially no force for small displacements wherein the essentially nonlinear spring is formed from a weak linear centering spring centered between strong linear springs;
providing a device comprising the essentially nonlinear spring and a mass wherein the essentially nonlinear spring is connected to the mass wherein the strong linear springs are not connected to the mass and the weak linear centering spring is connected to the mass;
connecting the device to the structure;
pumping the energy from the structure to the device wherein the pumping of the energy to the device is substantially one-way and irreversible wherein a majority of the energy does not return to the structure; and
capturing the energy with the device wherein the energy is transferred from the structure to the device at one or more resonant frequencies wherein the essentially nonlinear spring acts as a damper to capture and dissipate the energy.

2. The method of claim 1 further comprising the step of:
absorbing the energy from the structure with the device.

3. The method of claim 1 further comprising the step of:
dissipating the energy from the structure with the device.

4. The method of claim 1 further comprising the step of:
integrally forming the structure with the device.

5. The method of claim 1 further comprising the step of:
eliminating the energy from the structure.

6. A method for transferring energy from a structure, the method comprising the steps of:
connecting a mass to a first weak linear spring and a second weak linear spring wherein the first weak linear spring and the second weak linear spring are attached to opposite sides of the mass;
connecting the first weak linear spring and the second weak linear spring to a housing;
connecting a first strong linear spring to the housing wherein the first strong linear spring is adjacent to the first weak linear spring and further wherein the first strong linear spring is not connected to the mass;
connecting a second strong linear spring to the housing wherein the second strong linear spring is adjacent to the second weak linear spring and further wherein the second strong linear spring is not connected to the mass wherein the first strong linear spring, the second strong linear spring, the first weak linear spring and the second weak linear spring form a device comprising the mass and an essentially nonlinear spring that has a force-displacement relation that is substantially nonlinearizable wherein the essentially nonlinear spring exerts substantially no force for small displacements;
connecting the housing to the structure;
pumping the energy from the structure to the essentially nonlinear spring, the housing and the mass wherein the pumping of the energy to the essentially nonlinear spring, the housing and the mass is substantially one-way and irreversible wherein a majority of the energy does not return to the structure; and
capturing the energy with the device wherein the energy is transferred from the structure to the device wherein the essentially nonlinear spring acts as a damper to capture and dissipate the energy.

7. The method of claim 6 further comprising the step of:
constraining the mass with guides attached to opposite sides of the housing wherein the mass is constrained between the guides and the guides exhibit friction which assists to dissipate the energy.

\* \* \* \* \*

UNITED STATES PATENT AND TRADEMARK OFFICE
CERTIFICATE OF CORRECTION

PATENT NO. : 7,568,565 B2
APPLICATION NO. : 10/919752
DATED : August 4, 2009
INVENTOR(S) : D. Michael McFarland, Lawrence A. Bergman and Alexander F. Vakakis It is certified that error appears in the above-identified patent and that said Letters Patent is hereby corrected as shown below:

In Column 2, line 65, change "a essentially nonlinear spring" to "an essentially nonlinear spring"

In Column 6, line 57, change "the damper is connected" to "the damper are connected"

In Column 7, line 55, change "broad-band" to "broadband"

In Column 13, line 66, change "or a the primary linear" to "or a primary linear"

In Column 18, line 8, delete "As a result, the housing 620 and/or the primary structure 610."

In Column 18, line 56, delete "As a result, the housing 720 and/or the primary structure 710."

In Column 19, line 19, change "thae" to "take"

In Column 19, line 33, delete "As a result, the housing 820 and/or the primary structure 810."

Signed and Sealed this

Sixteenth Day of February, 2010

David J. Kappos
*Director of the United States Patent and Trademark Office*